(12) United States Patent
Bartl et al.

(10) Patent No.: US 12,366,446 B2
(45) Date of Patent: Jul. 22, 2025

(54) SYSTEMS AND METHODS FOR EVALUATING A GAP BETWEEN STRUCTURAL COMPONENTS

(71) Applicant: THE BOEING COMPANY, Arlington, VA (US)

(72) Inventors: Andreas Bartl, Bavaria (DE); Tobias Weber, Augsburg (DE); José Antonio Blanco del Álamo, Madrid (ES); kwok Tung Chan, Mercer Island, WA (US)

(73) Assignee: The Boeing Company, Arlington, VA (US)

( * ) Notice: Subject to any disclaimer, the term of this patent is extended or adjusted under 35 U.S.C. 154(b) by 103 days.

(21) Appl. No.: 18/321,026

(22) Filed: May 22, 2023

(65) Prior Publication Data

US 2024/0393109 A1    Nov. 28, 2024

(51) Int. Cl.
*G01B 21/16* (2006.01)
*B23B 49/00* (2006.01)
*B25J 19/02* (2006.01)

(52) U.S. Cl.
CPC .............. *G01B 21/16* (2013.01); *B23B 49/00* (2013.01); *B25J 19/02* (2013.01)

(58) Field of Classification Search
CPC .............. B23B 49/00; B23B 2260/128; B23B 2260/0482; B23B 2260/134; B23B 2260/0485; B23B 2260/0487; B23B 2260/048; B23B 2251/52; Y10T 408/17; Y10T 408/172; Y10T 408/57; Y10T 408/175; B23Q 15/013; B23Q 17/09; B23Q 17/0966; B23Q 17/22; B23Q 15/007; G01B 21/16; G01B 21/08; G01B 21/18; G01B 5/068; G01B 5/14; G01B 5/143; G01B 5/16

See application file for complete search history.

(56) References Cited

U.S. PATENT DOCUMENTS 6,665,948 B1 * 12/2003 Kozin ................... A61B 90/06
                                                    175/45
8,277,154 B2 * 10/2012 Brown ............... G05B 19/4163
                                                    408/1 R (Continued)

OTHER PUBLICATIONS

Extended European Search Report for EP 24200625.2-1201, dated Feb. 14, 2025.

(Continued)

*Primary Examiner* — Huy Q Phan
*Assistant Examiner* — Martin Walter Braunlich
(74) *Attorney, Agent, or Firm* — Joseph M. Butscher; The Small Patent Law Group LLC (57) ABSTRACT

A system and a method include a control unit configured to receive one or more force signals from one or more force sensors coupled to one or both of a tool or an end effector. The one or more force signals are indicative of one or more forces exerted in relation to the tool or the end effector as the tool operates on a first component and a second component. The control unit is further configured to detect a difference in the one or more forces as an operative portion of the tool passes through a gap between the first component and the second component. The control unit is further configured to determine a distance of the gap based on the difference in the one or more forces.

20 Claims, 9 Drawing Sheets

(56) References Cited

U.S. PATENT DOCUMENTS

| | | | |
|---|---|---|---|
| 9,102,026 B2* | 8/2015 | Miller | B23Q 17/22 |
| 2013/0039709 A1 | 2/2013 | Goh | |
| 2018/0126509 A1 | 5/2018 | Pereira | |
| 2018/0215054 A1* | 8/2018 | Brudniok | B25J 19/02 |
| 2022/0214658 A1* | 7/2022 | Ros Vega | B23Q 17/2428 |
| 2022/0331975 A1 | 10/2022 | Cochrane | |

OTHER PUBLICATIONS

Von Drigalski, et al: "Vibration-Reducing End Effector for Automation of Drilling Tasks in Aircraft Manufacturing," IEEE Robotics and Automation Letters, IEEE, vol. 2, No. 4 (2017).

* cited by examiner

SYSTEMS AND METHODS FOR EVALUATING A GAP BETWEEN STRUCTURAL COMPONENTS

FIELD OF THE DISCLOSURE

Examples of the present disclosure generally relate to systems and methods for evaluating a gap between different structural components, such as during a manufacturing process of an aircraft.

BACKGROUND OF THE DISCLOSURE

During a manufacturing process, various components can be coupled together. In general, two different components can be coupled together, and operated on by a tool. As an example, during a manufacturing process of an aircraft, outer skin portions of wings are secured to spars, ribs, or the like. For various reasons, a gap can be formed between different components (such as an outer skin of a wing and a tie rod). Further, gaps can form and/or expand during a drilling process. Such gaps can be susceptible to foreign object debris, such as chips from material that are generated during drilling. As such, measuring gaps between components is typically essential in the assembly of aircraft structures to ensure that load limits are satisfied.

In assembly of aircraft structures, gaps between different components (such as two, three, four, or more components) can be produced by slight surface and shape inaccuracies. The gaps cause increased preloads after assembly. Increased preload can lead to increased overall loads in a formed structure. As such, limited load capabilities of joints can be exceeded. Shimming is a process of compensating for the gaps using thin material layers. The measurement of a remaining gap size after shimming is used to determine conformance with safety regulations, preload limitations, and load capabilities of joints.

Gap width can be measured using feeler gauges in an iterative process. A feeler gauge set includes flexible steel blades with different thicknesses. The gap width is measured by inserting increasing gauge thicknesses until the gauge does not fit into the gap. Such can be used as part of the shimming process, in which a shim is fitted to fill an existing gap until requirements are met.

However, the process is time consuming, as several changes of feeler gauges are used, and can also lead to errors in measurements. Further, a particular gap between two components may not be accessible by a feeler gauge. Accessibility can be particularly difficult with respect to fully-assembled structures. Also, the process of using feeler gauges is performed manually, and is typically time and labor intensive.

SUMMARY OF THE DISCLOSURE

A need exists for an efficient, effective, and accurate system and method for measuring a gap between structural components.

With that need in mind, certain examples of the present disclosure provide a system including a control unit configured to receive one or more force signals from one or more force sensors coupled to one or both of a tool or an end effector. The one or more force signals are indicative of one or more forces exerted in relation to the tool or the end effector as the tool operates on a first component and a second component. The control unit is further configured to detect a difference in the one or more forces as an operative portion of the tool passes through a gap between the first component and the second component. The control unit is further configured to determine a distance of the gap based on the difference in the one or more forces.

In at least one example, the tool is a drill.

In at least one example, the control unit is configured to determine the distance of the gap as the tool operates on the first component and the second component.

In at least one example, the one or more force sensors are coupled to the tool. In at least one other example, the one or more force sensors are coupled to the end effector.

In at least one other example, the one or more force sensors include a first force sensor coupled to the tool, wherein the first force sensor is configured to output a first force signal; and a second force sensor coupled to the end effector, wherein the second force sensor is configured to output a second force signal. The control unit can be further configured to compare the first force signal with the second force signal to determine if one or both of the first component or the second component is deforming. In at least one example, the first force sensor is configured to detect a torque of the tool.

In at least one example, the control unit is configured to determine the distance of the gap by recording a time series signal for a hole through the first component or the second component; determining a deconvolution with a vector that represents a geometry of the tool; performing a force model on a force time series, thereby providing a time series with a specific force that represents material characteristics at the operative portion for each point in time; projecting a specific cutting force time series to an axial drill position using encoder time series data and interpolation; segmenting specific force levels; and computing the distance of the gap from one or more segments having a comparably low specific force.

Certain examples of the present disclosure provide a method including receiving, by a control unit, one or more force signals from one or more force sensors coupled to one or both of a tool or an end effector, wherein the one or more force signals are indicative of one or more forces exerted in relation to the tool or the end effector as the tool operates on a first component and a second component; detecting, by the control unit, a difference in the one or more forces as an operative portion of the tool passes through a gap between the first component and the second component; and determining, by the control unit, a distance of the gap based on the difference in the one or more forces.

Certain examples of the present disclosure provide a non-transitory computer-readable storage medium comprising executable instructions that, in response to execution, cause one or more control units comprising a processor, to perform operations comprising: receiving one or more force signals from one or more force sensors coupled to one or both of a tool or an end effector, wherein the one or more force signals are indicative of one or more forces exerted in relation to the tool or the end effector as the tool operates on a first component and a second component; detecting a difference in the one or more forces as an operative portion of the tool passes through a gap between the first component and the second component; and determining a distance of the gap based on the difference in the one or more forces.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, examples of the present disclosure provide systems and methods for measuring a gap between structural components. The systems and methods operate during a tool-operating process, such as a drilling, cutting, stamping, or other such process. The systems and methods include one or more force sensors configured to measure tool thrust force, and/or torque during a tool-operating process. In at least one example, a specific cutting force that characterizes the material of the components is restored from the measured forces using a simple model. After a projection of the signal from time domain to axial drill position, gap distance is inferred from segmentation of different specific cutting force levels of the air gap (which is approximately zero) and the materials of the components.

Figure 1:
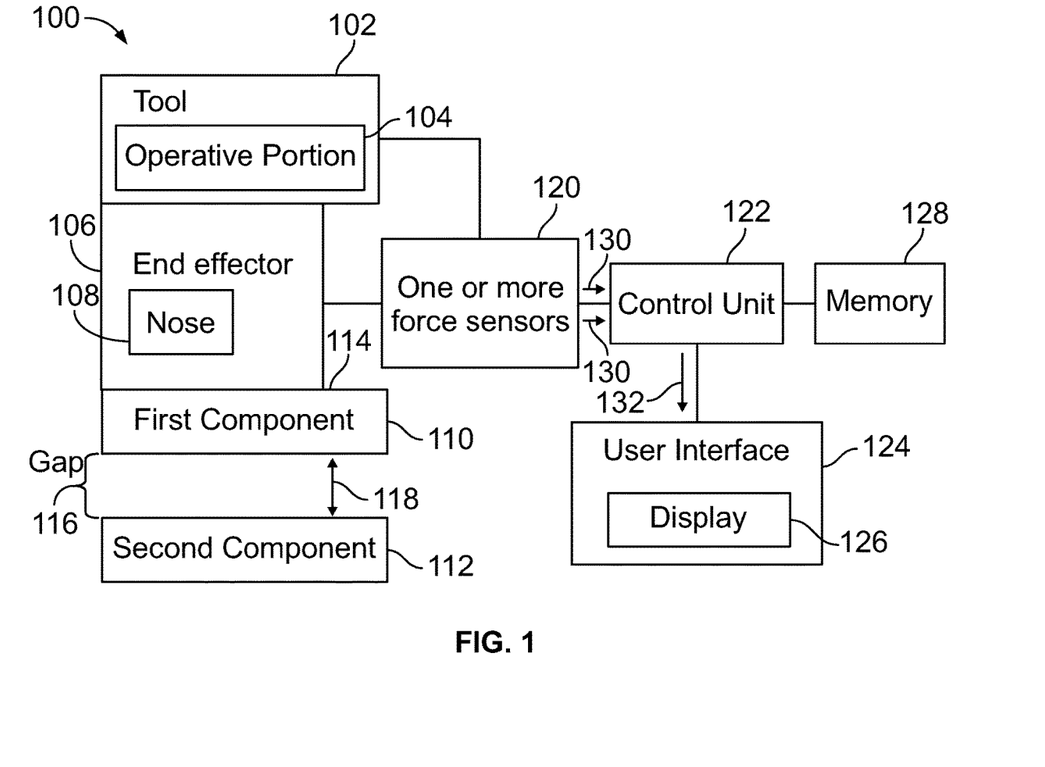
FIG. 1 illustrates a simplified block diagram of a system, according to an example of the present disclosure.

FIG. 1 illustrates a simplified block diagram of a system 100, according to an example of the present disclosure. The system 100 includes a tool 102 having an operative portion 104. As an example, the tool 102 is a drill, and the operative portion 104 is a drill bit coupled to a spindle. As another example, the tool 102 is a saw, and the operative portion 104 is a blade. As another example, the tool 102 is a stamping device, and the operative portion 104 is a stamping press. As another example, the tool 102 is a laser forming device, such as a laser cutting device, and the operative portion 104 is a laser beam.

The tool 102 can be operatively coupled to an end effector 106 having a nose 108 (for example, a pressure foot). The operative portion 104 of the tool 102 is configured to fit into and through the nose 108 to operate on a first component 110 and a second component 112. Optionally, the system 100 may not include the end effector 106. Instead, the tool 102 can be configured to operate on the first component 110 and the second component 112 without the end effector 106.

The first component 110 can be a panel, block, wall, sheet, bracket, connector, or the like. The second component 112 can be a panel, block, wall, sheet, bracket, connector, or the like. In at least one example, the first component 110 can be a skin of a wing of an aircraft being manufactured, and the second component 112 is a shear tie to which the skin is to be secured.

A gap 116 is formed between the first component 110 and the second component 112. The gap 116 has a distance 118.

In order to measure the distance 118, one or more force sensors 120 are coupled to one or both of the tool 102, and/or the end effector 106. As an example, a force sensor 120 is coupled to one of the tool 102 or the end effector 106. As another example, a first force sensor 120a (shown in FIG. 3) is coupled to the tool 102, and a second force sensor 120b is coupled to the end effector 106. The force sensor(s) 120 are configured to detect forces exerted during operation of the tool 102. Examples of the force sensor(s) 120 include load cells, pneumatic load cells, capacitive load cells, strain gages, hydraulic load cells, transducers, and the like. As another example, a force sensor 120 can be coupled to a spindle that is attached to a drill. In this example, the force sensor 120 detects drilling process data, such as torque applied to a component being drilled.

A control unit 122 is in communication with the force sensor(s) 120, such as through one or more wired or wireless connections. The control unit 122 receives force signals indicative of detected forces from the force sensor(s) 120. In at least one example, the control unit 122 can also be in communication with the tool 102 and configured to control operation of the tool 102. Optionally, the control unit 122 is not configured to control operation of the tool 102.

In at least one example, the control unit 122 is also in communication with a user interface 124, which includes a display 126, such as through one or more wired or wireless connections. The user interface 124 can be part of a computer workstation, a handheld device (such as a smart phone or tablet), or the like. The display 126 can be an electronic monitor, a digital display, or the like.

The control unit 122 is also in communication with a memory 128, such as through one or more wired or wireless connections. The memory 128 can be separate and distinct from the control unit 122. Optionally, the memory 128 can be part of the control unit 122. The memory 128 stores data regarding the first component 110 and the second component 112, operational characteristics of the tool 102, and/or the like. For example, the memory 128 stores data regarding the materials of the first component 110 and the second component 112.

Each material can be characterized by a specific operating force (such as drilling, cutting, or the like), which is used to compute operating forces in models stored in memory. The specific operating force as a material property can be restored from the actually measured operating force, thrust force, motor torque, and/or the like.

In at least one example, the nose 108 abuts into a surface 114 of the first component 110. The tool 102 can couple to the end effector 106 such that the operative portion 104 extends through the nose 108 and engages the first component 110. During operation, the tool 102 operates to form a tool-operating operation on the first component 110 and the second component 112. Examples of the tool-operating operation include drilling, cutting, stamping, laser forming, and/or the like.

As the tool 102 operates on the first component 110, the force sensor(s) 120 detect forces exerted by the tool 102 and/or on the first component 110, within the gap 116, and on the second component 112. For example, the force sensor(s) 120 can detect thrust force exerted by the tool 102, on the first component 110, through the gap 116, and the second component 112, on the surface of the first component 110, and/or the like. As another example, the force sensor(s) 120 can detect torque exerted by the tool 102.

As the tool 102 operates, the forces generated differ as the operative portion 104 passes into and through the first component 110, the gap 116, and the second component 112. For example, as the operative portion 104 passes into the first component 110, the force sensor(s) 120 detect a first force, such as a first thrust force and/or a first torque. As the operative portion 104 passes into the gap 116, the force sensor(s) 120 detect a second force, such as a second thrust force and/or a second torque, which differs from the first force. Similarly, as the operative portion 104 engages the second component 112, the force sensor(s) 120 detect a third force, such as a third thrust force and/or a third torque, which differs from the second force. The third force can be the same or similar as the first force, depending on the materials of the first component 110 and the second component 112. For example, if the first component 110 and the second component 112 are formed of the same material, the first force and the third force can be the same or similar. Optionally, if the first component 110 and the second component 112 are formed of different materials, the first force and the third force can be different. Because the gap 116 is a space between the first component 110 and the second component 112, the gap is filled with air, for example. Accordingly, the second force as exerted by the tool 102 as the operative portion 104 passes through the gap 116 differs from (for example, is substantially less) than the first force and the third force.

The control unit 122 receives force signals 130 indicative of the exerted force(s) by the tool 102 as the operative portion 104 passes through the first component 110, the gap 116, and the second component 112. The control unit 122 detects the differences between the first force, the second force, and the third force, which represent differences of the exerted force(s) of the tool 102 as the operative portion 104 passes through the first component 110, the gap 116, and the second component 112. Based on the difference between the force(s), the control unit 122 determines the distance 118 of the gap 116 between the first component 110 and the second component 112 as the tool 102 operates on the first component 110 and the second component 112. For example, the control unit 122 correlates the second force during a time period as the operative portion 104 passes through the gap 116 with the distance 118 of the gap 116. In this manner, the control unit 122 is able to determine the distance 118 of the gap 116 during operation of the tool 102.

In at least one non-limiting example, the control unit 122 determines the distance 118 of the gap 116 by first receiving the force signal(s) 130 from the force sensor(s) 120. In at least one example, the force signal(s) 130 include information indicative of thrust force of the tool, motor torque of the tool (such as a drill spindle), and/or the like. For example, in a drilling operation, the control unit 122 receives the force signal(s) 130, and records the time series signal for one formed hole through the first component 110 or the second component 112. Next, the control unit 122 determines a deconvolution with a vector that represents a cutting edge geometry of the tool 102, and a cutting force model is performed on a force time series, thereby providing a time series with a specific cutting force that represents the material characteristics at the operative portion 104 (such as a drill tip) for each point in time. The control unit 122 then projects the specific cutting force time series to an axial drill position using encoder time series data and interpolation, Next, the control unit 122 segments the specific force levels, and the distance 118 is computed from one or more segments having low (such as the lowest, or comparably lower) specific force (which is approximately zero) within the gap 116, as it is filled with air. The control unit 122 can further compensate for skin deflections caused by preload of the end effector 106 and deflection caused by an installed fastener using a stiffness model, which can be stored in the memory 128. In at least one example, instead of the deconvolution (and/or a convolution), other inverse cutting force models and/or a data driven, machine learning model can be used.

In response to determining the distance 118 of the gap, the control unit 122 can then output a signal 132 to the user interface 124. The signal 132 includes data regarding the determined distance 118 of the gap 116, which can then be shown on the display 126.

As noted, in at least one example, a first force sensor 120a is coupled to the tool 102, and a second force sensor 120b is coupled to the end effector 106. Each of the first force sensor 120a and the second force sensor 120b outputs force signals 130 to the control unit 122. The control unit 122 compares the different force signals from the first force sensor 120a and the second force sensor 120b to determine if they conform to one another. For example, if the first force sensor 120a outputs a first force signal 130 indicating a first exerted force, and the second force sensor 120b outputs a second force signal 130 indicating a second exerted force that conform to each other within a particular threshold (such as within +/−5%), as dictated by predetermined data stored in the memory 128, the control unit 122 determines that one or both of the first component 110 and/or the second component 112 are not deforming (for example, deflecting, bending, buckling, warping, or the like) past an acceptable amount. If, however, the exerted forces differ more than the particular threshold, the control unit 122 determines that the first component 110 and/or the second component 112 are deforming past the acceptable amount. The control unit 122 can output such deformation information within the signal 132, and such information can then be shown on the display 126.

Examples of the present disclosure provide systems and methods configured to manage the distance 118 of the gap 116 by detecting deflection of the first component 110 and/or the second component 112 during operation of the tool 102, such as a drill. In at least one example, the force sensor(s) 120 detect thrust force and output the force signals 130 which include thrust force data. Disagreement in forces detected by two different force sensors 120 (such as a first force sensor 120a coupled to the tool 102, and a second force sensor 120b coupled to the end effector 106) causes the control unit 122 to determine that the first component 110 and/or the second component 112 is deflecting as the operative portion 104 of the tool 102 operates thereon.

As described herein, example of the present disclosure allow for the measurement of interface gaps (such as the gap 116 between the first component 110 and the second component 112) on-the-fly, in real time during the tool-operating process, such as a drill operation. Compared to prior measuring methods, examples of the present disclosure do not require any additional measurement process, thereby leading to time and labor savings. Further, examples of the present disclosure allow for measurement of the gap 116 from only one side of a structure, such as from the surface 114. As such, the systems and methods described herein eliminate, minimize, or otherwise reduce accessibility limitations of prior methods. In this manner, examples of the present disclosure improve the efficiency of quality checks of assembled structures. Additionally, the systems and methods described herein can be integrated into automated processes, robotic equipment, and the like, which can also lead to time and cost savings. Further, the automatic determination of the distance 118 of the gap 116 by the control unit 122 leads to reliable and accurate measurement determinations and documentation, which are not susceptible to human error. Further, the systems and methods described herein are not susceptible to errors caused by debris, sealants, and/or the like, such as can be encountered by post tool operation processes performed by mechanical (for example, feeler gauges), and/or optical systems.

Determination of the distance 118 of the gap 116 by the control unit 122 during the tool-operating process (such as a drilling process) allows for corrections to be made to prevent or minimize gap formation.

As described herein the system 100 includes the control unit 122, which is configured to receive one or more force signals 130 from one or more force sensors 120 coupled to one or both of the tool 102 or the end effector 106. The force signal(s) 130 are indicative of one or more forces exerted in relation to (such as by and/or into) the tool 102 or the end effector 106 as the tool 102 operates on the first component 110 and the second component 112. The control unit 122 is further configured to detect a difference in the one or more forces as the operative portion 104 of the tool 102 passes through the gap 116 between the first component 110 and the second component 112. The control unit 122 is further configured to determine the distance 118 of the gap 116 based on the difference in the one or more forces (such as in relation to time).

In at least one example, the control unit 122 is configured to determine the distance 118 of the gap 116 before installing a fastener on, within, and/or through the first component 110 and/or the second component 112 in order to eliminate, minimize, or otherwise reduce undesired preload in the first component 110 and/or the second component 112.

In at least one other example, the control unit 122 can also be used to determine the existence and/or the distance 118 of the gap 116 as the tool operates on the first component 110 and the second component 112. For example, the control unit 112 is used to determine the distance 118 of the gap 116 as the tool 102 (for example, a drill) performs a drilling operation with respect to the first component 110 and the second component 112. In one-sided clamping scenarios (such as in relation to manufacturing of certain wings of aircraft), the end effector 106 can be equipped with a load cell in the nose 108. The load cell on and/or within the nose is used to check a preload of the end effector 106 on the first component 110. Such a load cell can be used instead of a dedicated drill thrust sensor.

As noted, the tool 102 can be a drill that is configured to perform drilling operations on the first component 110 and the second component 112. The drilling process may include repeatably extending and/or retracting the tool 102, and/or repeated oscillations of the tool 102.

In at least one example, the control unit 122 is configured to operate based on a model of cutting kinematics and/or cutting forces. Operation can be data driven, and/or based on machine learning models.

Figure 2:
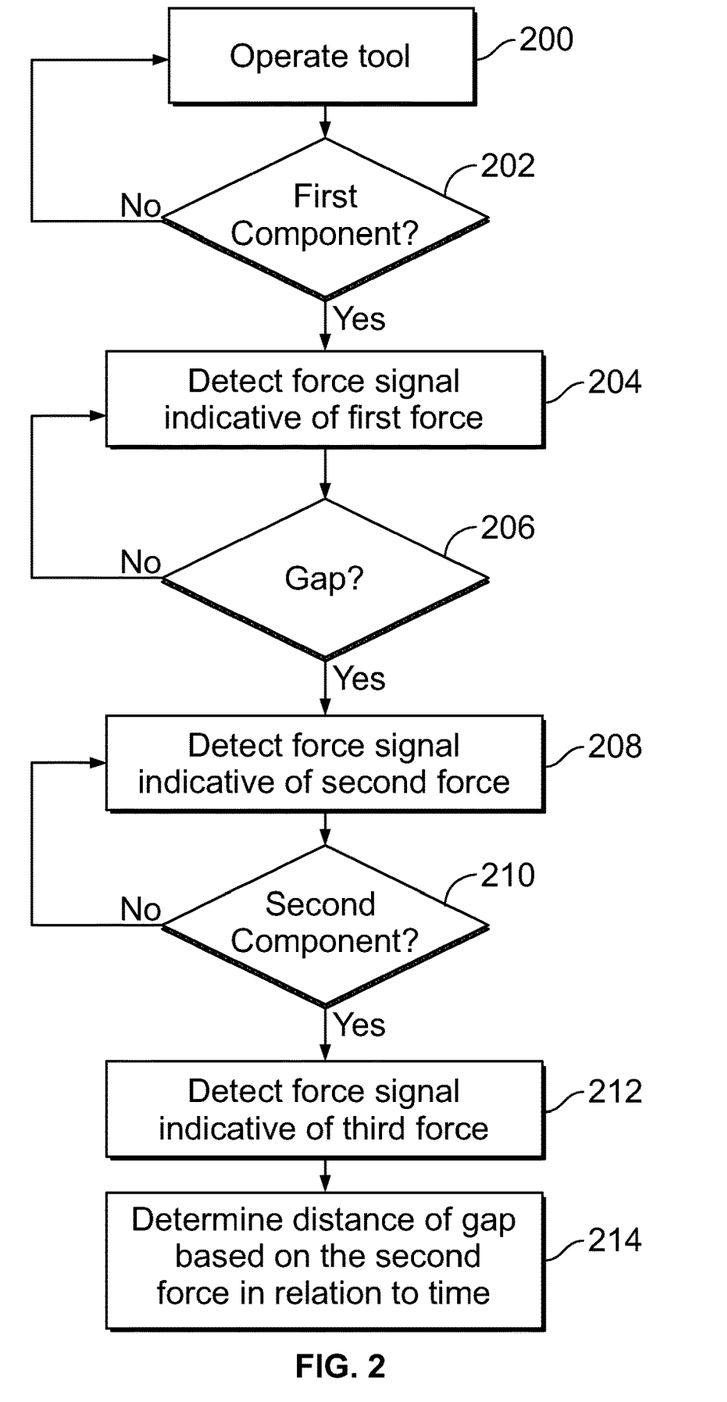
FIG. 2 illustrates a flow chart of a method, according to an example of the present disclosure.

FIG. 2 illustrates a flow chart of a method, according to an example of the present disclosure. Referring to FIGS. 1 and 2, at 200, the tool 102 is operated. At 202, it is determined (for example, by the control unit 122) if the operative portion 104 is engaging the first component 110. If not, the method returns to 200.

If, however, the tool 102 is operating such that the operative portion 104 is engaging the first component 110, the method proceeds to 204, at which the control unit 122 detects the force signal 130 indicative of a first force being exerted, such as by the tool 102.

At 206, it is determined (such as by the control unit 122) if the operative portion 104 is passing through the gap 116. If not, the method returns to 204.

If, however, the tool 102 is operating such that the operative portion 104 is passing through the gap 116, the method proceeds to 208, at which the control unit 122 detects the force signal 130 indicative of a second force being exerted, such as by the tool 102.

At 210, it is determined (such as by the control unit 122) if the operative portion 104 is engaging the second component 112. If not, the method returns to 208.

If, however, the tool 102 is operating such that the operative portion 104 is engaging the second component 112, the method proceeds to 212, at which the control unit 122 detects the force signal 130 indicative of a third force being exerted, such as by the tool 102.

At 214, the control unit 122 then determines the distance 118 of the gap 116 based on the second force in relation to time. For example, the control unit 122 determines the distance 118 based on the time period of the second force.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 122 may be or include one or more processors that are configured to control operation, as described herein.

The control unit 122 is configured to execute a set of instructions that are stored in one or more data storage units or elements (such as one or more memories), in order to process data. For example, the control unit 122 may include or be coupled to one or more memories. The data storage units may also store data or other information as desired or needed. The data storage units may be in the form of an information source or a physical memory element within a processing machine.

The set of instructions may include various commands that instruct the control unit 122 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 122. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 122 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
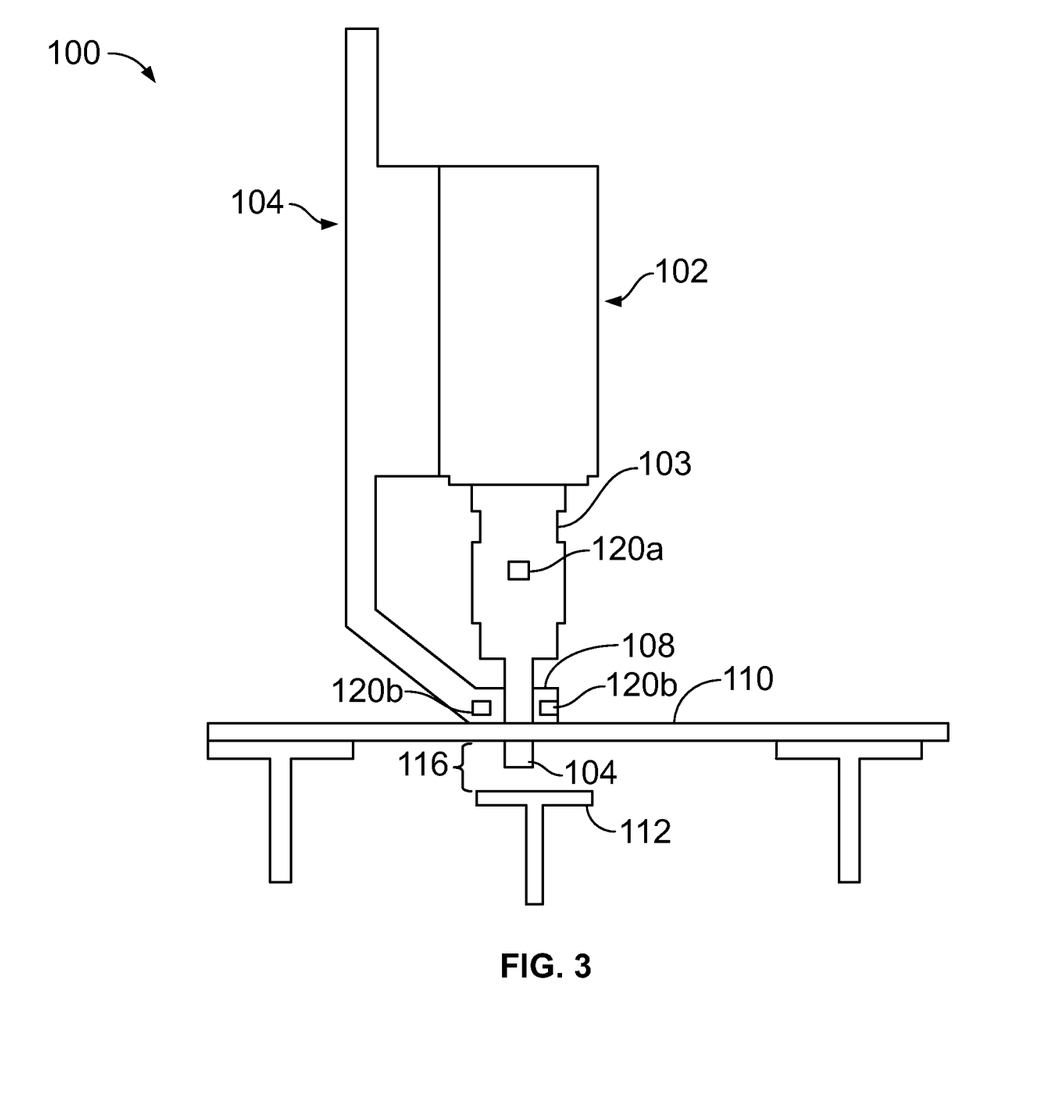
FIG. 3 illustrates a simplified lateral view of the system, according to an example of the present disclosure.

FIG. 3 illustrates a simplified lateral view of the system 100, according to an example of the present disclosure. In this example, the first component 110 can be a skin of a wing of an aircraft, and the second component 112 can be a shear tie. Further, the tool 102 can be a drill with a first sensor 120a, such as a torque measurement device, secured to a spindle 103. Optionally, the first sensor 120a can be integrated into a tool holder. The operative portion 104 can be a drill bit that passes through the nose 108 of the end effector 106. Further, the nose 108 can include one or more second sensors 120b, such as load cells proximate to the surface 114 of the first component 110.

Figure 4:
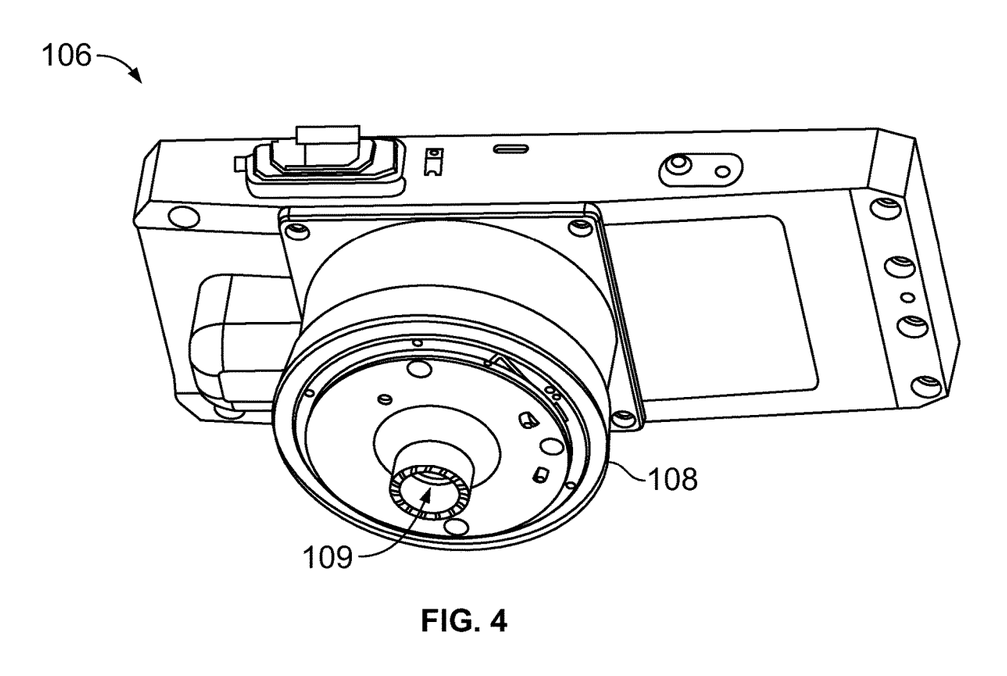
FIG. 4 illustrates a perspective bottom view of an end effector, according to an example of the present disclosure.

FIG. 4 illustrates a perspective bottom view of an end effector 106, according to an example of the present disclosure. The nose 108 is configured to abut against the surface 114 of the first component 110 (shown in FIG. 1). For example, the nose 108 is configured to clamp normal to the surface 114. The nose 108 includes an opening 109 that leads to a passage through which the operative portion 104 (such as a drill bit) of the tool 102 (shown in FIG. 1) passes.

Figure 5:
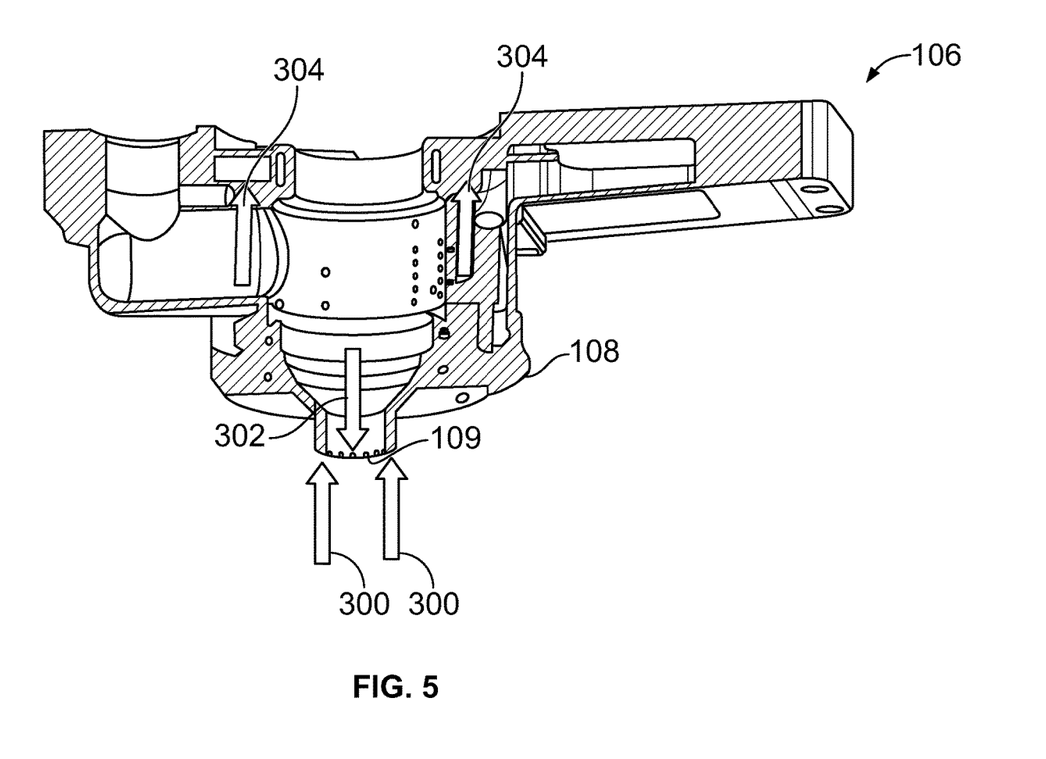
FIG. 5 illustrates a perspective internal view of the end effector of FIG. 4.

FIG. 5 illustrates a perspective internal view of the end effector 106 of FIG. 4. Referring to FIGS. 1-5, a force sensor 120 coupled to the end effector 106 can be a load cell, which is configured to detect a force, such as clamp load 300 exerted into the nose 108 by the first component 110. The force sensor 120, another force sensor, and/or a force sensor coupled to the tool 102 detects a force, such as drill thrust force 302, exerted by the tool 102. The control unit 122 can then determines a measured force 304, such as measured load, by subtracting the drill thrust force 302 from the clamp load 300.

Figure 6:
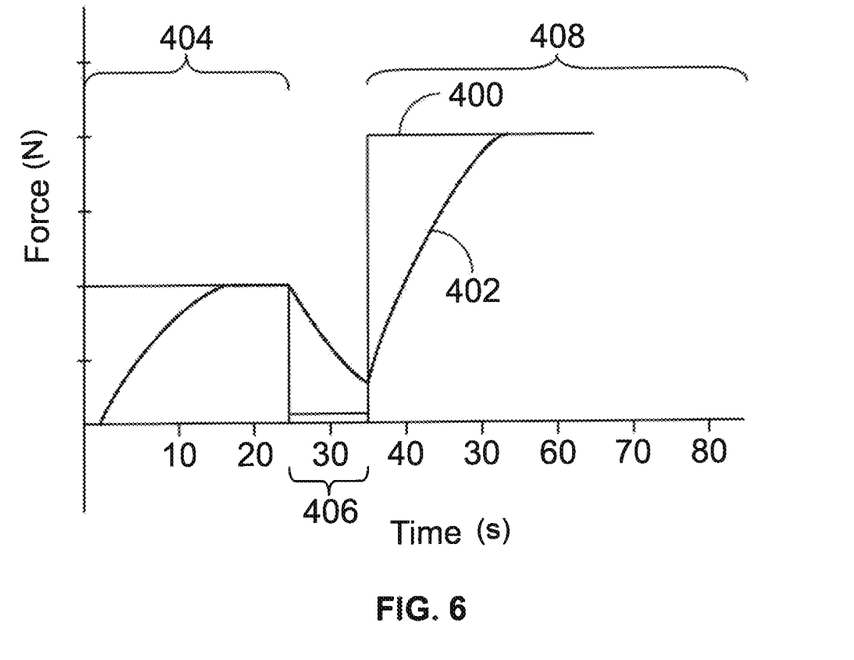
FIG. 6 illustrates a simplified graph of a specific cutting force in relation to a measured thrust force, according to an example of the present disclosure.

FIG. 6 illustrates a simplified graph of a specific cutting force 400 in relation to a measured thrust force 402, according to an example of the present disclosure. Referring to FIGS. 1-6, the specific cutting force is that actually exerted by the tool 102. The tool operates during a first time 404 during which the operative portion 104 engages the first component 110, a second time 406 during which the operative portion 104 passes through the gap 116, and a third time 408 during which the operative portion 104 engages the second component 110. The measured thrust force 402 is that detected by the control unit 122 via the force sensor(s) 120. As shown, the exerted force is substantially less during the second time 406, when the operative portion 104 passes through the gap 116. As described herein, the control unit 122 determines the distance 118 of the gap 116 based on the force exerted during the time 406.

Figure 7:
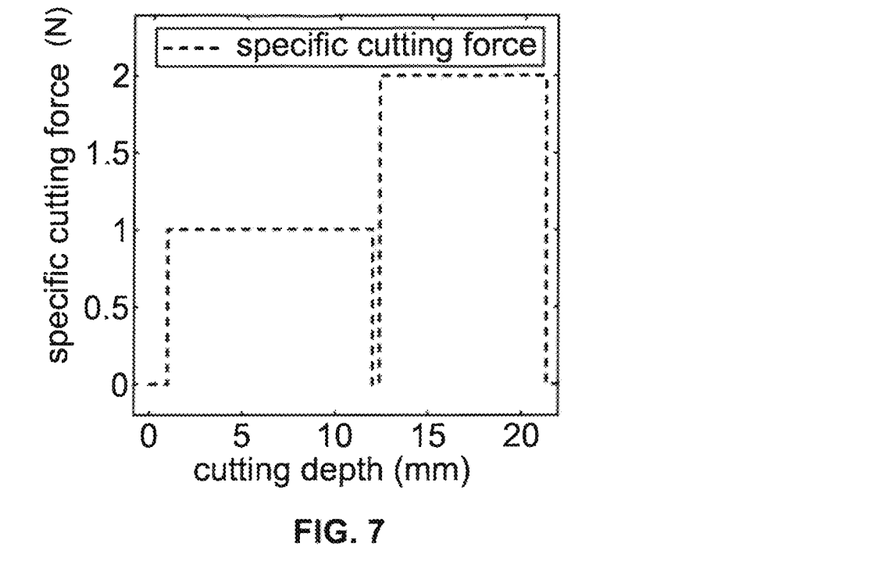
FIG. 7 illustrates a graph of a cutting depth in relation to a specific cutting force.

FIG. 7 illustrates a graph of a cutting depth in relation to a specific cutting force. The specific cutting forces may depend on positions of an operation portion of a tool in a material. The specific cutting force can be determined from the material.

Figure 8:
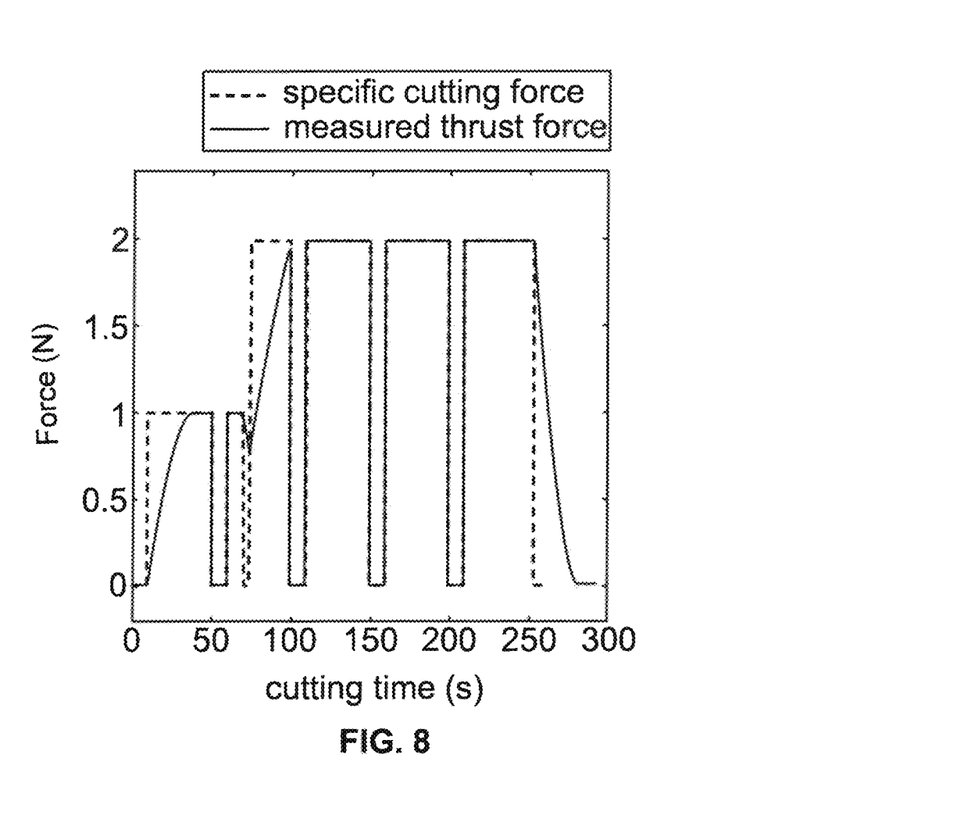
FIG. 8 illustrates a graph of cutting time in relation to drilling time.

FIG. 8 illustrates a graph of cutting time in relation to drilling time. FIG. 8 shows actual time domain signal of forces and specific cutting force at a tool tip at each time. A process may be used that includes a retract procedure to extract chips of material from a gap. As such, during retraction, a different specific force is generated at the tool tip.

Figure 9:
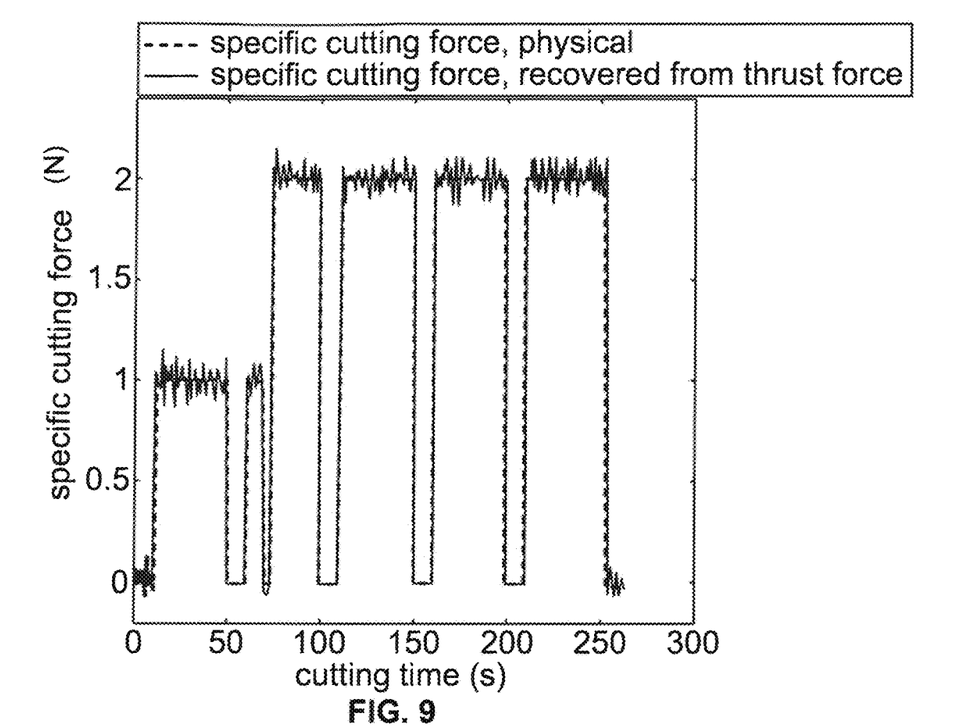
FIG. 9 illustrates a graph of cutting time in relation to specific cutting force.

FIG. 9 illustrates a graph of cutting time in relation to specific cutting force. Specific forces can be restored in time domain.

Figure 10:
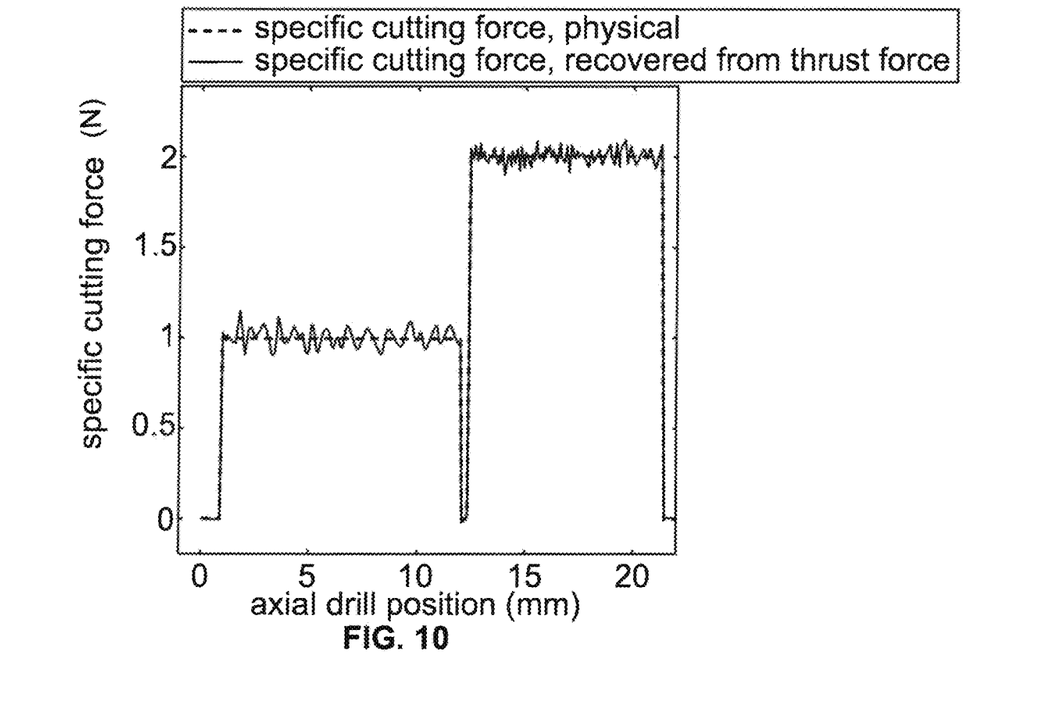
FIG. 10 illustrates a graph of axial drill position in relation to specific cutting force.

FIG. 10 illustrates a graph of axial drill position in relation to specific cutting force. As shown in FIG. 10, restored specific forces can be projected and/or transferred to tool position. The transformation can be done using encoder readings, for example.

Figure 11:
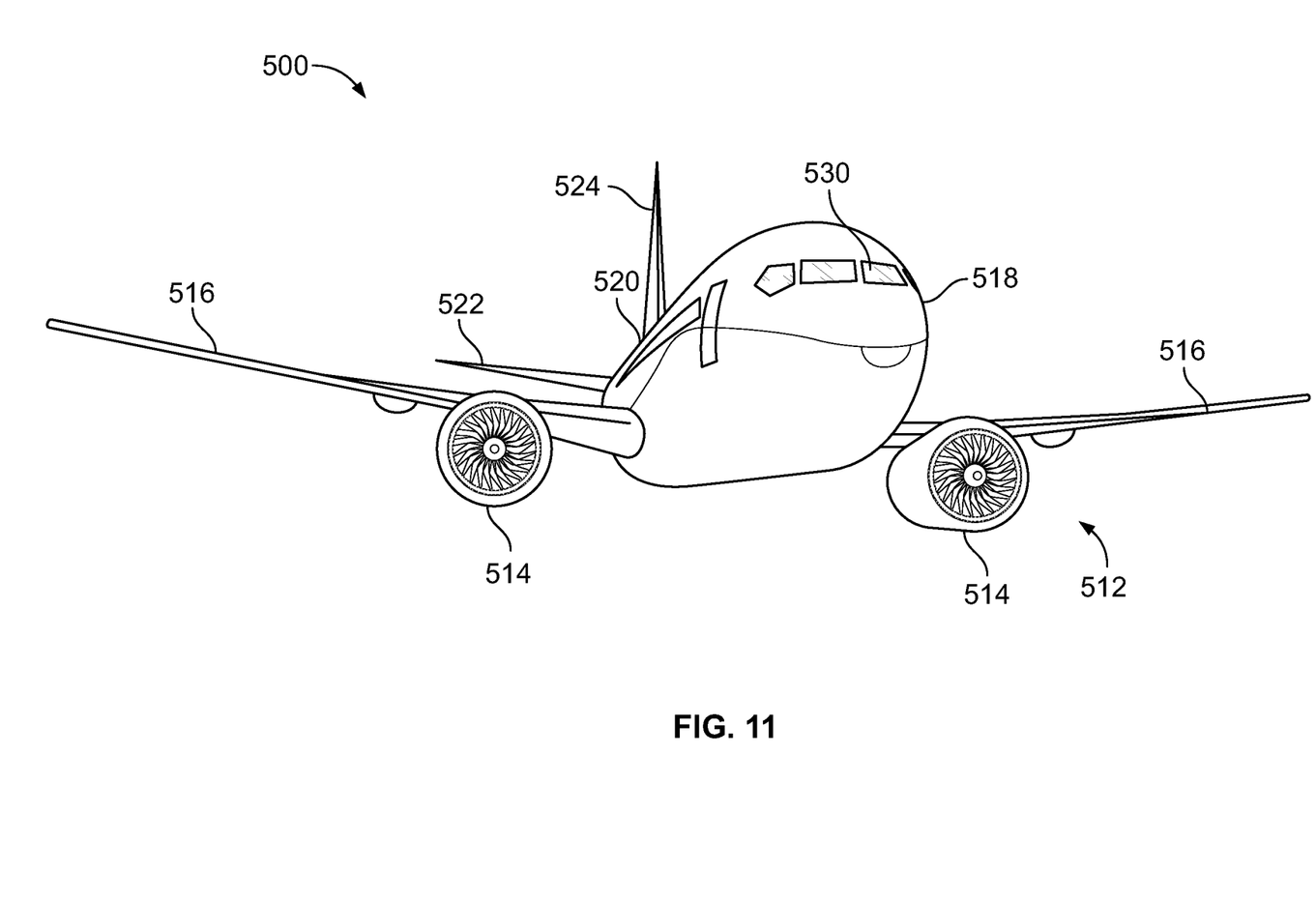
FIG. 11 illustrates a perspective front view of an aircraft, according to an example of the present disclosure.

FIG. 11 illustrates a perspective front view of an aircraft 500, according to an example of the present disclosure. The aircraft 500 includes a propulsion system 512 that includes engines 514, for example. Optionally, the propulsion system 512 may include more engines 514 than shown. The engines 514 are carried by wings 516 of the aircraft 500. In other examples, the engines 514 may be carried by a fuselage 518 and/or an empennage 520. The empennage 520 may also support horizontal stabilizers 522 and a vertical stabilizer 524. The fuselage 518 of the aircraft 500 defines an internal cabin 530, which includes a flight deck or cockpit, one or more work sections (for example, galleys, personnel carry-on baggage areas, and the like), one or more passenger sections (for example, first class, business class, and coach sections), one or more lavatories, and/or the like. Referring to FIGS. 1-11, examples of the present disclosure can be used during manufacture of various portions of the aircraft 500. For example, skins of wings are components that are secured to other internal components, such as spars, ribs, and the like.

FIG. 11 shows an example of an aircraft 500. It is to be understood that the aircraft 500 can be sized, shaped, and configured differently than shown in FIG. 7. Optionally, examples of the present disclosure can be used with various other vehicles. For example, instead of an aircraft, the vehicle can be a land-based vehicle, such as an automobile, a bus, a train car, or the like. As another example, the vehicle can be a watercraft. As another example, the vehicle can be a spacecraft. Optionally, examples of the present disclosure can be used with fixed structures, such as residential or commercial buildings.

Further, the disclosure comprises examples according to the following clauses:

Clause 1. A system comprising:
a control unit configured to:
receive one or more force signals from one or more force sensors coupled to one or both of a tool or an end effector, wherein the one or more force signals are indicative of one or more forces exerted in relation to the tool or the end effector as the tool operates on a first component and a second component;
detect a difference in the one or more forces as an operative portion of the tool passes through a gap between the first component and the second component; and
determine a distance of the gap based on the difference in the one or more forces.

Clause 2. The system of Clause 1, wherein the tool is a drill.

Clause 3. The system of Clauses 1 or 2, wherein the control unit is configured to determine the distance of the gap as the tool operates on the first component and the second component.

Clause 4. The system of any of Clauses 1-3, wherein the one or more force sensors are coupled to the tool.

Clause 5. The system of any of Clauses 1-3, wherein the one or more force sensors are coupled to the end effector.

Clause 6. The system of any of Clauses 1-3, wherein the one or more force sensors comprise:
a first force sensor coupled to the tool, wherein the first force sensor is configured to output a first force signal; and
a second force sensor coupled to the end effector, wherein the second force sensor is configured to output a second force signal.

Clause 7. The system of Clause 6, wherein the control unit is further configured to compare the first force signal with the second force signal to determine if one or both of the first component or the second component is deforming.

Clause 8. The system of Clauses 6 or 7, wherein the first force sensor is configured to detect a torque of the tool.

Clause 9. The system of any of Clauses 1-8, wherein the control unit is configured to determine the distance of the gap by:
recording a time series signal for a hole through the first component or the second component;
determining a deconvolution with a vector that represents a geometry of the tool;
performing a force model on a force time series, thereby providing a time series with a specific force that represents material characteristics at the operative portion for each point in time;
projecting a specific cutting force time series to an axial drill position using encoder time series data and interpolation;
segmenting specific force levels; and
computing the distance of the gap from one or more segments having a comparably low specific force.

Clause 10. A method comprising:
receiving, by a control unit, one or more force signals from one or more force sensors coupled to one or both of a tool or an end effector, wherein the one or more force signals are indicative of one or more forces exerted in relation to the tool or the end effector as the tool operates on a first component and a second component;
detecting, by the control unit, a difference in the one or more forces as an operative portion of the tool passes through a gap between the first component and the second component; and
determining, by the control unit, a distance of the gap based on the difference in the one or more forces.

Clause 11. The method of Clause 10, wherein said determining comprises determining the distance of the gap as the tool operates on the first component and the second component.

Clause 12. The method of Clauses 10 or 11, wherein the one or more force sensors are coupled to the tool.

Clause 13. The method of Clauses 10 or 11, wherein the one or more force sensors are coupled to the end effector.

Clause 14. The method of Clauses 10 or 11, wherein the one or more force sensors comprise:
a first force sensor coupled to the tool, wherein the first force sensor is configured to output a first force signal; and
a second force sensor coupled to the end effector, wherein the second force sensor is configured to output a second force signal.

Clause 15. The method of Clause 14, further comprising comparing the first force signal with the second force signal to determine if one or both of the first component or the second component is deforming.

Clause 16. The method of any of Clauses 10-15, wherein said determining comprises:
recording a time series signal for a hole through the first component or the second component;
determining a deconvolution with a vector that represents a geometry of the tool;
performing a force model on a force time series;
providing, in response to said performing, a time series with a specific force that represents material characteristics at the operative portion for each point in time;
projecting a specific cutting force time series to an axial drill position using encoder time series data and interpolation;
segmenting specific force levels; and
computing the distance of the gap from one or more segments having a comparably low specific force.

Clause 17. A non-transitory computer-readable storage medium comprising executable instructions that, in response to execution, cause one or more control units comprising a processor, to perform operations comprising:
receiving one or more force signals from one or more force sensors coupled to one or both of a tool or an end effector, wherein the one or more force signals are indicative of one or more forces exerted in relation to the tool or the end effector as the tool operates on a first component and a second component;
detecting a difference in the one or more forces as an operative portion of the tool passes through a gap between the first component and the second component; and
determining a distance of the gap based on the difference in the one or more forces.

Clause 18. The non-transitory computer-readable storage medium of Clause 17, wherein said determining comprises determining the distance of the gap as the tool operates on the first component and the second component.

Clause 19. The non-transitory computer-readable storage medium of Clauses 17 or 18, wherein the one or more force sensors comprise a first force sensor coupled to the tool, wherein the first force sensor is configured to output a first force signal; and a second force sensor coupled to the end effector, wherein the second force sensor is configured to output a second force signal, and further comparing the first force signal with the second force signal to determine if one or both of the first component or the second component is deforming.

Clause 20. The non-transitory computer-readable storage medium of any of Clauses 17-18, wherein said determining comprises:
  recording a time series signal for a hole through the first component or the second component;
  determining a deconvolution with a vector that represents a geometry of the tool;
  performing a force model on a force time series;
  providing, in response to said performing, a time series with a specific force that represents material characteristics at the operative portion for each point in time;
  projecting a specific cutting force time series to an axial drill position using encoder time series data and interpolation;
  segmenting specific force levels; and
  computing the distance of the gap from one or more segments having a comparably low specific force.

As described herein, examples of the present disclosure provide efficient, effective, and accurate systems and methods for measuring a gap between structural components.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
  a control unit configured to:
    receive one or more force signals from one or more force sensors coupled to one or both of a tool or an end effector, wherein the one or more force signals are indicative of one or more forces exerted in relation to the tool or the end effector as the tool operates on a first component and a second component;
    detect a difference in the one or more forces as an operative portion of the tool passes through a gap spacing apart the first component from the second component; and
    determine a distance of the gap spacing apart the first component from the second component based on the difference in the one or more forces.

2. The system of claim 1, wherein the tool is a drill.

3. The system of claim 1, wherein the control unit is configured to determine the distance of the gap as the tool operates on the first component and the second component.

4. The system of claim 1, wherein the one or more force sensors are coupled to the tool.

5. The system of claim 1, wherein the one or more force sensors are coupled to the end effector.

6. The system of claim 1, wherein the one or more force sensors comprise:
  a first force sensor coupled to the tool, wherein the first force sensor is configured to output a first force signal; and
  a second force sensor coupled to the end effector, wherein the second force sensor is configured to output a second force signal.

7. The system of claim 6, wherein the control unit is further configured to compare the first force signal with the second force signal to determine if one or both of the first component or the second component is deforming.

8. The system of claim 6, wherein the first force sensor is configured to detect a torque of the tool.

9. The system of claim 1, wherein the control unit is configured to determine the distance of the gap by:
  recording a time series signal for a hole through the first component or the second component;
  determining a deconvolution in relation to a vector that represents a geometry of the tool;
  performing a force model on a force time series, thereby providing a time series with a specific force that represents material characteristics at the operative portion for each point in time;
  projecting a specific cutting force time series to an axial drill position using encoder time series data and interpolation;

segmenting specific force levels; and computing the distance of the gap from one or more segments having a comparably low specific force.

10. A method comprising:

receiving, by a control unit, one or more force signals from one or more force sensors coupled to one or both of a tool or an end effector, wherein the one or more force signals are indicative of one or more forces exerted in relation to the tool or the end effector as the tool operates on a first component and a second component;

detecting, by the control unit, a difference in the one or more forces as an operative portion of the tool passes through a gap spacing apart the first component from the second component; and determining, by the control unit, a distance of the gap spacing apart the first component from the second component based on the difference in the one or more forces.

11. The method of claim 10, wherein said determining comprises determining the distance of the gap as the tool operates on the first component and the second component.

12. The method of claim 10, wherein the one or more force sensors are coupled to the tool.

13. The method of claim 10, wherein the one or more force sensors are coupled to the end effector.

14. The method of claim 10, wherein the one or more force sensors comprise:

a first force sensor coupled to the tool, wherein the first force sensor is configured to output a first force signal; and a second force sensor coupled to the end effector, wherein the second force sensor is configured to output a second force signal.

15. The method of claim 14, further comprising comparing the first force signal with the second force signal to determine if one or both of the first component or the second component is deforming.

16. The method of claim 10, wherein said determining comprises:

recording a time series signal for a hole through the first component or the second component;

determining a deconvolution in relation to a vector that represents a geometry of the tool;

performing a force model on a force time series;

providing, in response to said performing, a time series with a specific force that represents material characteristics at the operative portion for each point in time;

projecting a specific cutting force time series to an axial drill position using encoder time series data and interpolation;

segmenting specific force levels; and computing the distance of the gap from one or more segments having a comparably low specific force.

17. A non-transitory computer-readable storage medium comprising executable instructions that, in response to execution, cause one or more control units comprising a processor, to perform operations comprising:

receiving one or more force signals from one or more force sensors coupled to one or both of a tool or an end effector, wherein the one or more force signals are indicative of one or more forces exerted in relation to the tool or the end effector as the tool operates on a first component and a second component;

detecting a difference in the one or more forces as an operative portion of the tool passes through a gap spacing apart the first component from the second component; and determining a distance of the gap spacing apart the first component from the second component based on the difference in the one or more forces.

18. The non-transitory computer-readable storage medium of claim 17, wherein said determining comprises determining the distance of the gap as the tool operates on the first component and the second component.

19. The non-transitory computer-readable storage medium of claim 17, wherein the one or more force sensors comprise a first force sensor coupled to the tool, wherein the first force sensor is configured to output a first force signal; and a second force sensor coupled to the end effector, wherein the second force sensor is configured to output a second force signal, and further comparing the first force signal with the second force signal to determine if one or both of the first component or the second component is deforming.

20. The non-transitory computer-readable storage medium of claim 17, wherein said determining comprises:

recording a time series signal for a hole through the first component or the second component;

determining a deconvolution in relation to a vector that represents a geometry of the tool;

performing a force model on a force time series;

providing, in response to said performing, a time series with a specific force that represents material characteristics at the operative portion for each point in time;

projecting a specific cutting force time series to an axial drill position using encoder time series data and interpolation;

segmenting specific force levels; and computing the distance of the gap from one or more segments having a comparably low specific force.

* * * * *